(12) United States Patent
Elson et al.

(10) Patent No.: US 11,529,977 B1
(45) Date of Patent: Dec. 20, 2022

(54) RADAR ENABLED DETERMINATION OF PRESENCE, AXLE COUNT, SPEED, AND DIRECTION OF A RAIL CAR

(71) Applicant: Diane Albert, Los Ranchos, NM (US)

(72) Inventors: John Todd Elson, Boise, ID (US); Michael George Melville, Albuquerque, NM (US); Nicolas Martinez, Albuquerque, NM (US); Richard Skotnicki, Los Alamos, NM (US)

( * ) Notice: Subject to any disclaimer, the term of this patent is extended or adjusted under 35 U.S.C. 154(b) by 0 days.

(21) Appl. No.: 17/499,802

(22) Filed: Oct. 12, 2021

(51) Int. Cl.
*B61K 9/00* (2006.01)
*G01S 17/88* (2006.01)
*G01S 13/88* (2006.01)

(52) U.S. Cl.
CPC .............. *B61K 9/00* (2013.01); *G01S 13/88* (2013.01); *G01S 17/88* (2013.01)

(58) Field of Classification Search
CPC . B61K 9/00; G01S 13/88; G01S 17/88; B61L 25/021; B61L 25/023; B61L 25/025; B61L 1/10; B61L 1/16; B61L 1/168
See application file for complete search history.

(56) References Cited

U.S. PATENT DOCUMENTS

| | | | |
|---|---|---|---|
| 5,764,162 A | 6/1998 | Ehrlich | |
| 7,481,400 B2 | 1/2009 | Appleby | |
| 7,523,893 B2 | 4/2009 | Francis | |
| 7,649,350 B2 | 1/2010 | Heyden | |
| 7,959,112 B2 | 6/2011 | Tiwari | |
| 8,655,540 B2 | 2/2014 | Mian | |
| 8,752,797 B2 | 6/2014 | Carlson | |
| 8,814,104 B2 | 8/2014 | Yoon | |
| 9,376,129 B2 | 6/2016 | Hilleary | |
| 9,390,385 B2 | 7/2016 | Kanner | |
| 9,457,819 B2 | 10/2016 | Ernst | |
| 9,784,829 B2 | 10/2017 | Zeng | |
| 10,144,439 B2 | 12/2018 | Hillmer | |
| 10,513,277 B2 | 12/2019 | Aisa | |
| 10,621,385 B2 | 4/2020 | Ehmke | |
| 10,752,273 B2 | 8/2020 | Clanney | |
| 10,754,030 B2 | 8/2020 | Noujeim | |
| 10,878,250 B2 | 12/2020 | Kernwein | |
| 2005/0225481 A1* | 10/2005 | Bonthron | H01Q 21/0093 342/175 |
| 2013/0018534 A1* | 1/2013 | Hilleary | B61L 29/30 701/19 |
| 2015/0285897 A1* | 10/2015 | Kilty | G01S 7/28 342/201 |
| 2016/0068173 A1* | 3/2016 | Fuchs | G06Q 10/0833 340/994 |
| 2017/0313331 A1* | 11/2017 | Hilleary | B61L 25/025 |
| 2019/0135317 A1* | 5/2019 | Hilleary | G01S 13/931 |
| 2021/0001900 A1 | 1/2021 | Cowen | |
| 2021/0001903 A1* | 1/2021 | Hilleary | B61L 25/023 |
| 2021/0109207 A1 | 4/2021 | Le | |
| 2021/0263145 A1 | 8/2021 | Wang | |
| 2021/0382169 A1* | 12/2021 | Achour | H01Q 15/0086 |

* cited by examiner

Primary Examiner — Russell Frejd
(74) Attorney, Agent, or Firm — Diane Albert

(57) ABSTRACT

The present invention comprises radar detection of rail car truck assembly features to determine the presence of a rail vehicle comprising a car, axle count of the vehicle, and the travel direction of and speed of a rail car.

19 Claims, 5 Drawing Sheets

RADAR ENABLED DETERMINATION OF PRESENCE, AXLE COUNT, SPEED, AND DIRECTION OF A RAIL CAR

CROSS-REFERENCE TO RELATED APPLICATIONS

This application claims the benefit of U.S. Provisional Application No. 63/090,013 filed Oct. 9, 2020 and the entire content is incorporated by reference herein and made part of this specification.

BACKGROUND OF THE INVENTION

Field of the Invention Technical Field)

The present invention comprises radar detection of rail car features to determine the presence of a rail vehicle comprising a car, axle count of the vehicle, and the travel direction and speed of a rail car. Numerous methods presently exist to determine presence, axle count, direction, and speed of a rail car, including but not limited to electrical, magnetic, acoustic, optical, mechanical, and combinations thereof.

The prior art for axle counting is replete with various types of wheel detection sensors, but these methods suffer from disadvantages. Present technologies disclose a rail mounted sensor that counts axles by detecting magnetic field changes caused by the presence of iron wheels. Installation and maintenance issues for this sensor type include drilling mounting holes through a steel web, fastening with bolts, and periodic mechanical calibration.

A similar type of wheel detection sensor is disclosed by a sensor that leverages similar physical principles as other sensors but is easier to install, utilizing an adjustable mechanical clamp on the underside of the rail. This sensor requires periodic calibration and the clamp performance suffers in the high vibration environment of mainline rail traffic. The prior art for the presence detection mode of the invention includes several categories. Reno A&E invented vehicle presence detector utilizing inductive loops. The disadvantage of the loops is that they require installation of wire across a number of railroad ties. The wire is subject to failure under normal rail maintenance operations and can be the target of vandalism Radar-based techniques have also been created to detect train presence. Current known technology discloses a radar-based technique with transmitter and receiver on opposite sides of a track, relying on the train to pass or block the radio signal. Other known technologies describe an impulse radar apparatus to detect the presence of a rail car wheel. It detects changes in the amplitude of reflected pulses to infer presence of a wheel, and with proper configuration also velocity and direction of the wheel. Its chief disadvantage is the lack of a narrow beam, allowing for multiple returns from several aspects of the train, as well as the requirement to place multiple receivers along the rail to determine velocity and direction.

Speed and direction can also be inferred by laser-based systems mounted above the tracks.

The Radar-enabled Determination of Presence, Axle count, Speed, and Direction of a Rail Car differs from the prior art by forming multiple antenna beams that allow discrimination between the wheel and other rail car aspects, leading to an accurate axle count. Speed and direction are also provided by using multiple beams from a co-located antenna.

BRIEF DESCRIPTION OF THE SEVERAL VIEWS OF THE DRAWINGS

The accompanying drawings disclosed which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings.

SUMMARY

The present invention comprises an apparatus comprising detectors of presence, axle count, direction, and speed of a rail car by a radar employing a chirp waveform and utilizing array antennas for transmit and receive paths. The apparatus is disposed between and below the top of rails, with an antenna boresight pointing horizontally toward a rail. The present invention comprises a method for detection of presence, axle count, direction, and speed of a rail car by a radar comprising installing a chirp waveform. The method further comprises detecting presence, axle count, direction, and speed of a rail car by LIDAR (LIGHT DETECTION AND RANGING). The apparatus is disposed between and below the top of the rails, with the LIDAR pointing toward and above the rail. The apparatus is disposed outside a rail and points toward the rail. The apparatus is disposed outside the rail and points toward and above the rail. The apparatus is disposed between and below the top of the rails, with LIDAR pointing toward and above the rail.

DETAILED DESCRIPTION OF THE INVENTION

The present invention comprises an apparatus and method for detection of presence, axle count, direction, and speed of a rail car by a radar employing a chirp waveform and utilizing array antennas for transmit and receive paths. The device is installed between and below the top of the rails, with antenna boresight pointing toward a rail and slightly above it.

Multiple antenna beams are formed in the vertical or horizontal directions or both. Presence of a wheel is distinct from presence of aside frame or other physical aspects of a rail car by using vertically displaced multiple beams with narrow beamwidths that discriminate between wheels and side frames Speed and direction are provided by horizontally displaced multiple beams beamwidths pointing right and left of boresight in the horizontal direction, utilizing Doppler shift to compute speed and direction.

A master processor links to the radar device and provides control, storage, processing, and data transfer functions.

The invention serves to provide presence, axle count, speed, and direction of rail cars by a compactin-rail radar sensor. It reduces the burden of installation and maintenance associated with current solutions while maintaining accuracy and compatibility with systems that frame rail vehicles in transit.

Figure 1:
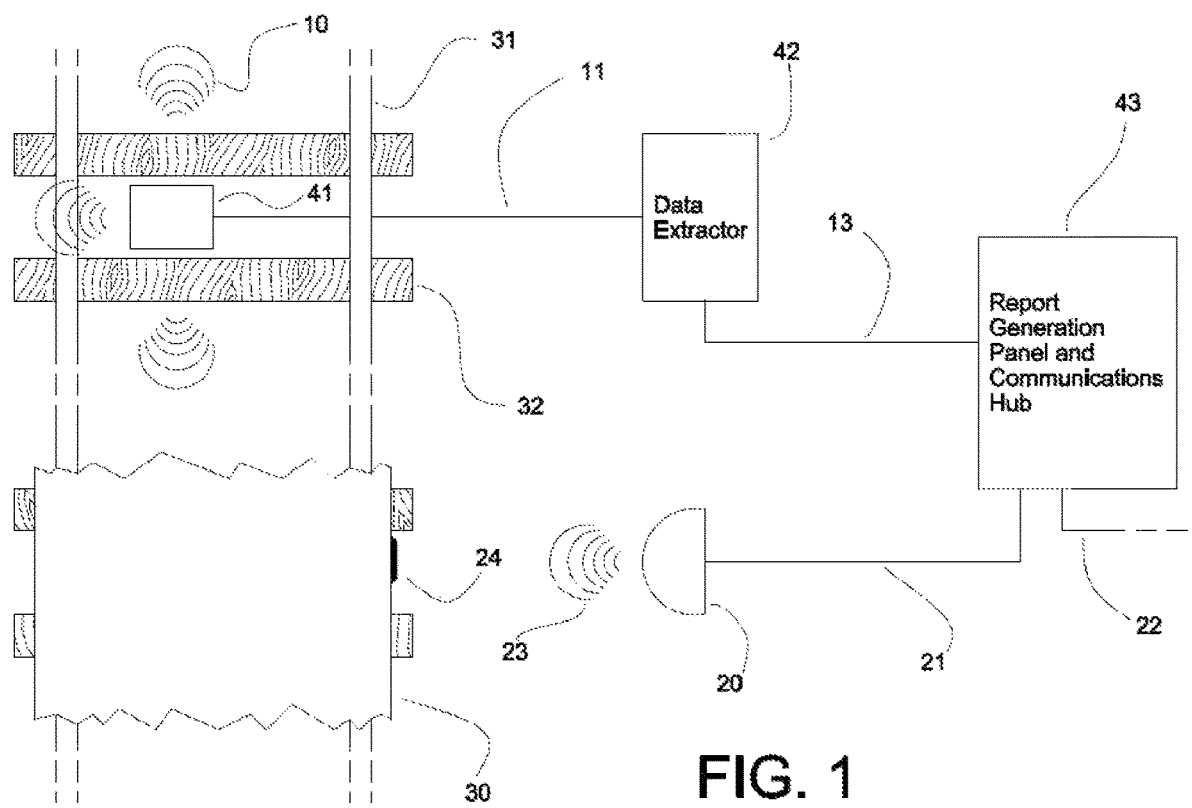
FIG. 1 illustrates the radar sensor located between rails and between rail ties.

FIG. 1 illustrates the radar sensor located between rails and between rail ties. Radar sensor 41 comprises antennas and radar transceivers as shown in FIG. 1 and attaches to data extractor 42 outside the rails with power and datalinks 13. The extractor comprises power and long distance data connections 13 to a report generation panel which comprises presence, axle count, speed, and direction data with RFID tag reads to generate a frame report for each rail car. This report generation panel is common in rail systems, having connections to other system sensors such as RFID.

The system of the present invention comprises the following elements. Microwave Energy 10 for Radar Presence, Speed, Direction, and Axle Detection. Power and Data Link 11 to Data Extractor (Data Processor), Power and Data Link 13 to Report Generation Panel, antenna 20 for Rail Car Identification System, Coaxial Cable 21, Power and Data Cable 22, Microwave Energy 23 for Rail Car Identification System, Transponder 24 on Rail Car for Rail Car Identification System, Rail Car 30, Rail Track 31, Rail Tie 32, Radar Source Unit 41, Data Extractor 42, and Report Generation Panel and Communications Hub 43.

Figure 2:
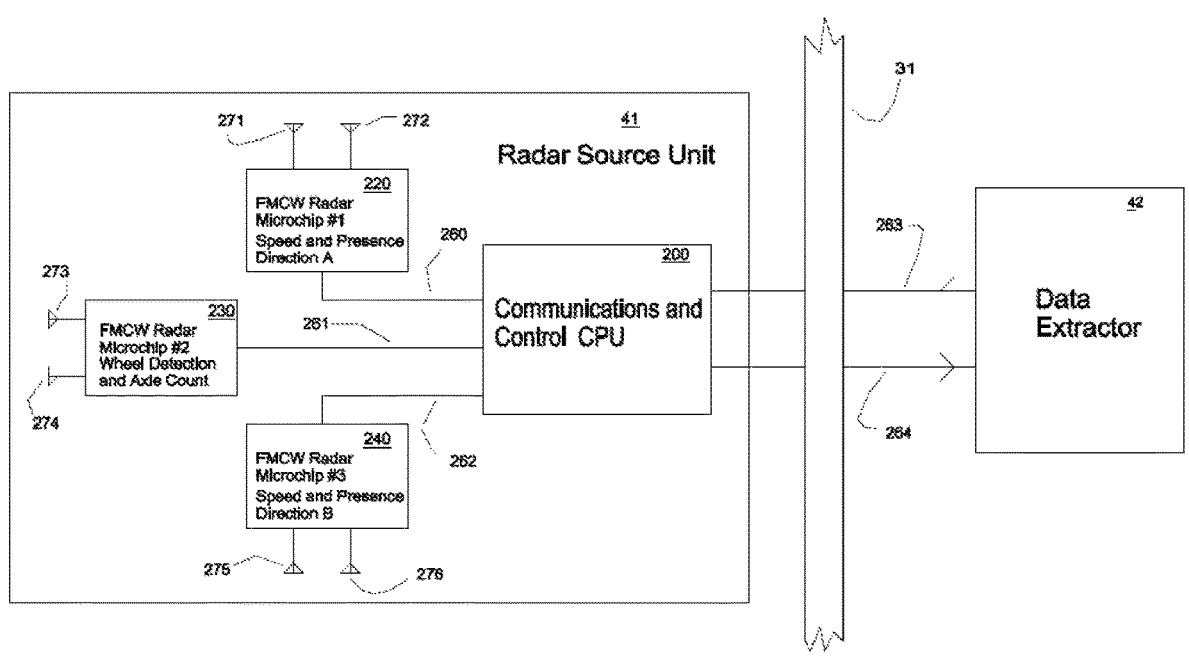
FIG. 2 contains more detail for the transceivers and antennas.

FIG. 2 describes in more detail the transceivers and antennas. Wheel detection and axle counting are carried out by radar system-on-chip (SoC) 230 and antennas 273 and 274, as depicted in FIG. 2. While speed and direction is also handled by this SoC, it is convenient to use a separate SoC for that function, carried out by radar SoC 220 and antennas 271 and 272, and another direction by radar SoC 240 and antennas 275 and 276. All SoC link to a central processing unit (CPU) 200 that ties to the data extractor 42 by data lines 263 and 264.

The system of the present invention comprises the following elements. FMCW Radar Microchip #1 Speed and Presence Direction A 220, FMCW Radar Microchip #2 Wheel Detection and Axle Count 230, FMCW Radar Microchip #3 Speed and Presence Direction 240, Data and Power Wiring Microchip #1310 260, Data and Power Wiring Microchip #2 261, Data and Power Wiring Microchip #3 262, Data and Power Wiring Data Extractor to Radar Source Unit 263, Data and Power Wiring Radar Source Unit to Data Extractor 264, Microchip #1 Radar Transmit Antenna 271, Microchip #1 Radar Receive Antenna 272, Microchip #2 Radar Transmit Antenna 273, Microchip #2 Radar Receive Antenna 274, Microchip #3 Radar Transmit Antenna 275, and Microchip #3 Radar Receive Antenna 276.

While radar-enabled detection of static and moving objects is well-established, practical implementation of it in the rail industry has been elusive. Recent developments that enable it are high bandwidth radars contained in an SoC with advanced signal processing algorithms to generate multiple narrow beams with an antenna array. These systems are cost-effective and require little in the way of passive components, trading discrete hardware complications for software development to ensure radar returns are processed rapidly enough to accurately detect targets.

It is preferable for a system to provide presence, axle count, speed, and direction in a system within a single enclosure, making installation cheaper and easier and improving reliability.

The heart of the device is composed of radar transceivers and antennas that utilize bandwidths appropriate for the required resolution and preferably use the frequency modulated continuous wave (FMCW) approach. A specific FMCW method employs a 'chirp', a signal whose frequency increases linearly over the time interval during the chirp pulse. The received pulse is processed to provide range, angle, and velocity information. Traditionally these systems required a large number of discrete components, but are now available in SoC form factor, increasing reliability. This compact form requires a significant amount of software for the processing of the radar returns and must process the radar returns fast enough to keep up with industrial rail vehicles moving up to 100 mph. The radar SoC requires a stable power supply and a small number of components, optionally residing on the same printed circuit board as its antenna arrays.

The sensor, including transceivers and antenna arrays, is mounted between rails, and is linked by power and communication cables to a data extractor outside the rails. The antennas consist of a single array pointed at the rail or additionally include arrays, pointed upstream and downstream of the rail. The array pointing at the rail generates multiple narrow beams to create an effective angular signature for a wheel compared to other portions of the rail car. A connection to an external system, either a multi-conductor cable or wireless link, is required to transfer the radar information for storage, analysis, and additional transfer to a remote location.

Presence detection uses vertically-displaced beams pointing at the rail to detect large returns at adjacent angles (when a wheel is present) versus large and small returns at adjacent angles (when a side frame is present). The presence indicator must not only indicate something is on the rail, but discriminate wheels from other targets, so that axles are counted as required for typical rail monitoring systems.

An additional physical property of railcars is that the side frame lies about 9" or 22 cm beyond the wheels. Hence a system with resolution of a few centimeters could additionally use this to validate the wheel-side frame determination.

The effectiveness of this approach requires narrow beams and sufficiently short ranges to ensure that a majority of the power transmitted in the main beam is captured by the wheel. Larger beamwidths create clutter that represent other targets, reducing discrimination of the wheel. Separating the wheel from other objects improves as the beam gets narrower, at the cost of a larger and more expensive antenna. Antenna size for a given gain is proportional to the frequency, or the inverse of the wavelength, so an increase in frequency leads to a smaller antenna for the same gain. For example, at 60 GHz, where the wavelength is 5 mm, an antenna with 15° of beamwidth is approximately 2 cm in dimension. The footprint of this beam on a target at a 60 cm range is approximately 15 cm, where the edges of the footprint are defined by the half-power locations of the beam. Train wheels are approximately 1 meter in diameter, considerably larger than the beamwidth.

Before the advent of radars empowered with digital signal processing (DSP), analog versions formed multiple fixed beams with specific feed systems or steered beams with variable phase shifters to determine the angle to the target. The modern DSP-based methods rely on Fast Fourier Transforms (FFT) to process discrete data rapidly. This processing of the angular information results in classifying the returns into angular bins. Were a system to have bins corresponding to −7.5° and +7.5°, a target at 0° would generally produce comparable strength returns in both bins, while targets at located at −7.5 and +7.5° would produce strongest returns in their respective matching bins.

A target that is moving relative to the pointing angles of the beams will produce varying signal strengths in each bin as it moves through the composite antenna array field of view. The side frame of a rail car spans the length between the wheels, slightly outboard of them, and extends approximately half the distance from the top of the car to the rail. The gap between the bottom of the side frame and the rail can be exploited in combination with narrow beams to discriminate between wheel and side frame. Furthermore, the approximate 22 cm additional range to the side frame is useful, as a system with hypothetical resolution of 3 cm would render it at 7-8 range bins away from the wheel.

The preferred operation for the system is to have a bin for boresight and additional bins above and below this. There is a static return from the metallic rail that is binned into the angle corresponding to the angular displacement of the boresight with respect to the horizon. The radar returns in this bin are typically constant, and for other bins are typically very small except for the time when the wheel is within the field of view, when the amplitude increases dramatically.

A classical method of determining speed and direction utilizes the Doppler shift of a reflected signal, and here could be enacted with a beam pointed up or downstream toward a train. Alternately, a multibeam radar with boresight pointing at the rail can be used with horizontally displaced beams. These beams provide Doppler shifts that scale with the cosine of the angle with respect to the rail. They also conveniently provide two estimates of speed and direction by way of beams displaced angularly to either side of boresight. This allows the entire device to use a single antenna array that alternately scans vertically for presence and horizontally for speed and direction.

Alternate method of computing speed is leveraging the known, constant wheel size and the time in the beam to calculate speed. The speed of the car is computed by its diameter divided by the time in the beam. North American rail systems contain several diagnostic systems performing a number of tasks for purposes of identification, safety, and presence detection, among others. The sensors utilized in these systems must be accurate, rugged, and cost-effective. Detecting the presence of a rail car truck assembly is done in a number of ways. The idea presented here is to obtain axle count, presence, direction, and speed of a railcar with a radar-based sensor. Radar technology has long been in use for direction and speed, and other technologies have been implemented for axle count and presence. Inclusion of all functions into a single apparatus is one of the features of this invention. Obtaining axle count and presence is the most significant technical challenge of the three and will be elaborated on first.

The invention is a track-mounted Frequency modulated continuous wave (FMCW) radar that classifies radar returns from the wheels and side frame of rail car truck assemblies in order to validate their passage. Key features of the radar system include:

FMCW sawtooth waveform
Wide bandwidth to allow for range resolutions of few centimeters
Antenna array to allow for small angular resolutions
Single narrow transmit beam
Digital signal processing (DSP) of the returned signals (returns) received by an antenna array to provide range and angular estimates of all targets within the field of view
Fast system operation to detect the primary targets several times while in the field of view Legacy radar systems that tracked objects utilized analog phase shifting devices to steer receiver beams in the direction of maximum return. The range of the target was determined by the time delay of the return compared to the transmit signal. The phase shift combined with the antenna geometry was used to estimate the angle of the target with respect to the antenna pointing angle. If both azimuth and elevation angles were determined in this manner, the combination with the range information provided a location estimate of the target.

Modern radar systems utilize digital signal processing (DSP) technology that conceptually creates multiple receive beams without analog phase shifters. Fast Fourier Transforms (FFT) of the received signal on the array elements determines both range and angle information of the returns, placing the returns into bins separated by range and angle resolutions. The shape of the FMCW sawtooth waveform, a time-gated pulse whose frequency content increases linearly during the cycle, is well-suited for this purpose. The transmit function of the radar is relatively simple, consisting of a single beam pointing away from the antenna ('boresight'), with duration and spectral content governed by the FMCW waveform. The receiver side is more complicated and utilizes the DSP features mentioned above. The angle of the target requires multiple discrete elements of an antenna array. An array composed of elements aligned in a linear direction will produce an angular estimate in the plane containing that line and the antenna boresight. Typically that plane is either azimuth or elevation. While two-dimensional systems can be constructed that produce two angles, only a single angle is required in the current system and corresponds to elevation.

Using terms more aligned with historical radar systems, the current system 'scans' in elevation. Scanning in azimuth leads to more difficult interpretation of the radar returns because multiple targets (among two wheels and a side frame) are producing returns in each time frame. Elevation scanning time-gates the returns for each wheel and side frame and provides a static return of the rail, the latter performing a system health check and potential calibration function.

The antenna boresight angle is preferentially pointed above the horizon to maximize useful radar returns and reduce ground clutter. The preferred location for the radar antenna is centered between rails and pointed to one side at 25° to 45° above the horizon. With the receiver scanning vertically, the static return from the rail is displaced from 0° by approximately the same amount. As this return remains at essentially constant strength and location, it provides a reference for other returns and a system health check. The returns for a wheel arrive at a unique range and angle while returns for a side rail arrive at a unique and different range and angle. Significant increases in radar cross section (RCS) over baseline values coincide with the time period when the wheel and side frame are in the field of view. These RCS values are persistent over several frames of the radar system. While multipath is significant in this system owing to the complicated metal structure encapsulating the area of interest, the multipath returns arrive at random ranges and angles and with lower RCS compared to the wheels and side frame.

The resulting data from the radar sensor creates a multidimensional signature for each rail car truck assembly. The signature can be imagined with a graph of RCS versus range and a two dimensional scatter plot with returns represented as markers or 'dots'. The time period before a car is present in the field of view represents a baseline status, where the only dominant return of interest is from the rail. This is easily recorded in the system with an initial calibration upon system installation. A persistent and significant return is seen at the range of interest on the RCS-range plot while a persistent dot is observed in a scatter plot at an angle corresponding to the antenna boresight angle above the ground. The first wheel entering the field of view causes the RCS to increase significantly at the range corresponding to the effective distance to the wheel, and simultaneously generates consistent dots in a tight area of the scatter plot which locates the effective angle and range of the wheel. This is repeated during the transit of the second wheel through the field of view, separated by an analogous dataset for the side frame at a different effective range and angle.

The signature of two wheels and a side frame confirms the presence and passage of a single rail car truck assembly with two axles, and can be sent in compact form upstream to a system processor for bundling with other railcar identification characteristics such as the unique sequence in its RFID tag. A sample of this is provided below as experimental data from a simulated rail car truck assembly and prototype radar system. Three snapshots of the system during the passage of the assembly are provided, each with a plot of RCS versus range and a scatter plot of significant radar returns (appearing as markers or dots) over range and elevation angle. Angles to the right of center in the scatter plot are below radar boresight, which was 45° above the horizon, and angles to the left are above boresight.

A prototype testbed demonstrating the idea was assembled, resembling a rail car truck assembly traveling on a rail over a short distance. The testbed did not have all components shown in FIGS. 1 and 2, not containing a report generation panel and rail car identification. It contained a single radar microchip and necessary accessory components integrated with an antenna on a single printed circuit board, pointed at the rail. The data extractor was replaced with a personal computer. The truck assembly and rail surfaces were metallized to ensure significant radar return. The radar system was mounted halfway between the rails with top height approximately equal to the top of the rail, pointing at 45° above horizon, and scanning in elevation.

Figure 3:
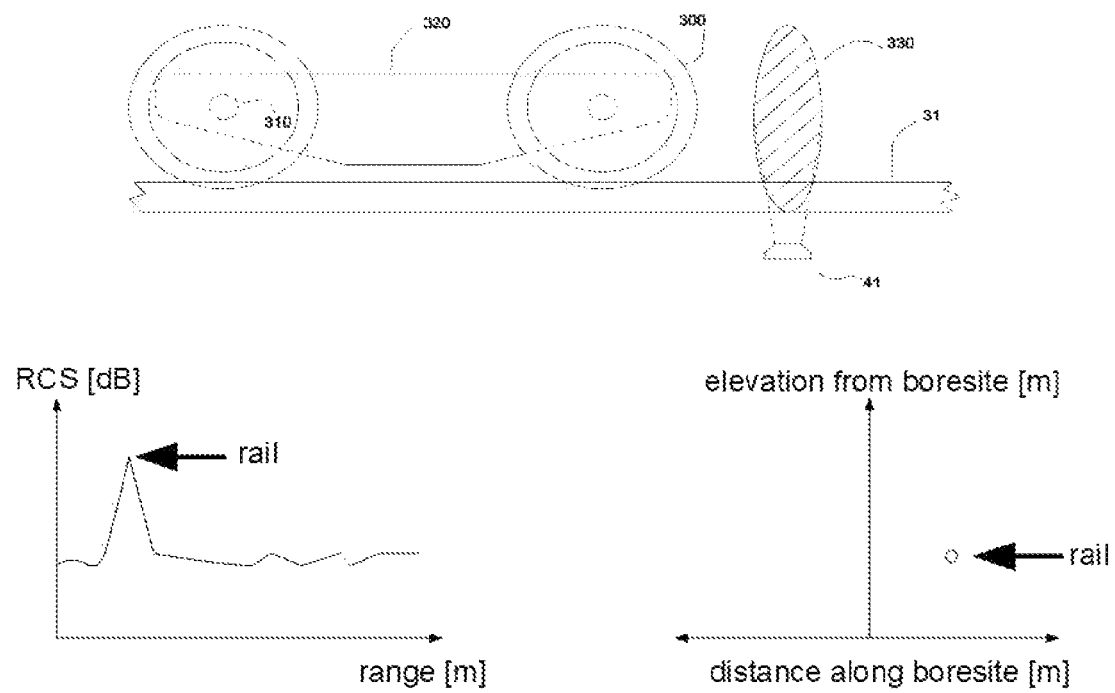
FIG. 3 illustrates a field of view of a prototype.

FIG. 3 describes the timer period when the rail car truck assembly is out of the radar field of view. The only significant expected radar return is caused by the rail, and it appears at constant range, angle, and RCS amplitude. The RCS versus range plot displays a single peak at a specific range, while the target location plot identifies the range and elevation angle of the rail with a marker. The elements of the present invention in FIG. 3 comprise Rail Truck Assembly Wheel 300, Rail Wheel Axle 310, Truck Assembly Side Frame 320, and Radar Energy Footprint {assign number to radar energy footprint if necessary}.

Figure 4:
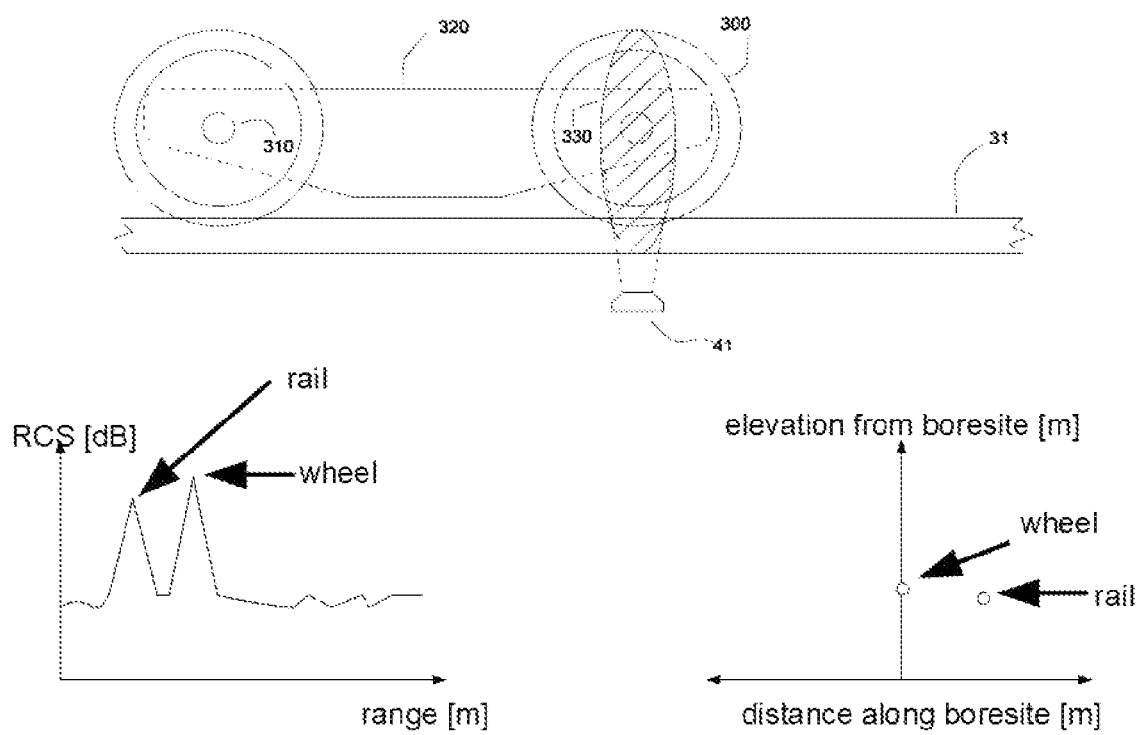
FIG. 4 illustrates a second field of view of a prototype.

FIG. 4 describes the time period while either wheel is located in the radar field of view. The RCS versus range plot demonstrates significant peaks corresponding to the wheel and the rail at their respective ranges. The target location plot contains markers identifying range and elevation angle for the wheel and rail.

Figure 5:
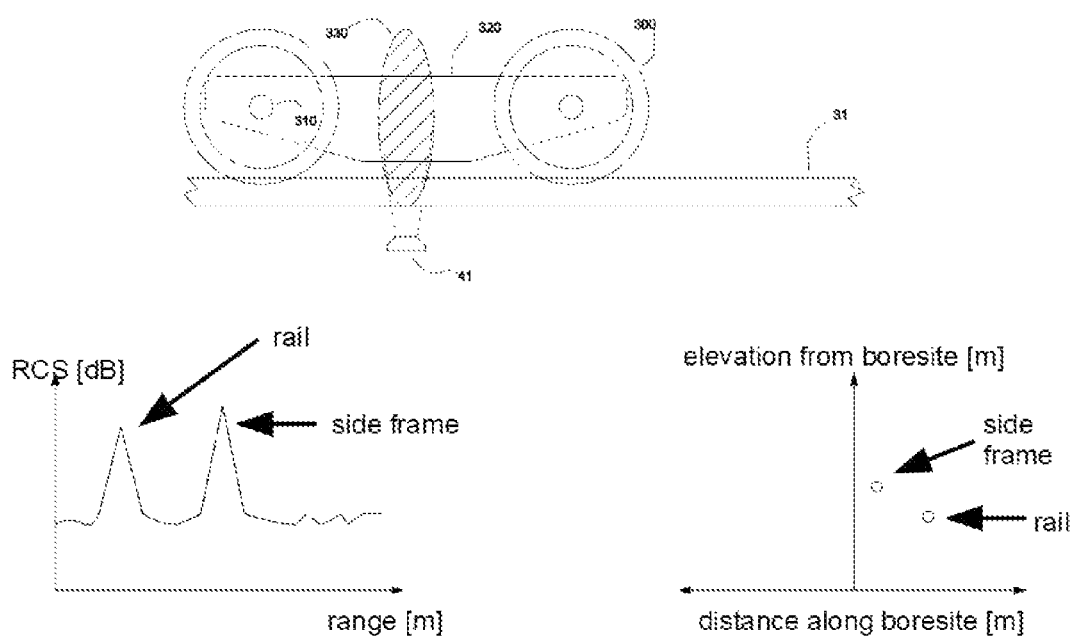
FIG. 5 illustrates a third field of view of a prototype.

FIG. 5 illustrates the time period when the side frame is in the radar field of view. It is important that the device be capable of discriminating wheels from side frames. The RCS versus range plot demonstrates unique significant peaks corresponding to the wheel and the side frame at their respective ranges. The target location plot contains markers identifying range and elevation angle unique for both the wheel and side frame.

The signature of two wheels and a side frame confirms the presence and passage of a single rail car truck assembly with two axles, and can be sent in compact form upstream to a system processor for bundling with other railcar identification characteristics such as the unique sequence in its RFID tag.

Note that in the specification and claims, "about" or "approximately" means within twenty percent (20%) of the numerical amount cited. As used herein, the singular forms "a," "an," and "the" include plural referents unless the context clearly dictates otherwise. Thus, for example, reference to "a functional group" refers to one or more functional groups, and reference to "the method" includes reference to equivalent steps and methods that would be understood and appreciated by those skilled in the art, and so forth.

Although the invention has been described in detail with particular reference to the disclosed embodiments, other embodiments can achieve the same results. Variations and modifications of the present invention will be obvious to those skilled in the art and it is intended to cover all such modifications and equivalents. The entire disclosures of all patents and publications cited above are hereby incorporated by reference.

What is claimed is:

1. An apparatus comprising:
    at least one detector to detect each of the following: presence, axle count, direction, and speed of a rail car by a radar employing a chirp waveform and utilizing array antennas for transmit and receive paths;
    a radar sensor located between rails comprising array antennas and radar transceivers;
    wherein said radar transceivers use the frequency modulated continuous wave (FMCW) approach, wherein the FMCW employs a chirp, wherein said chirp comprises a signal whose frequency increases linearly over time during a chirp pulse, a master processor linking a radar device and providing control, storage, processing, and data transfer functions; and
    antenna arrays with a boresight angle pointed above the Earth's horizon.

2. The apparatus of claim 1 wherein said apparatus is disposed between and below the top of rails, with an antenna boresight pointing toward a rail and above Earth's horizon.

3. The apparatus of claim 2 wherein said apparatus comprises said antenna boresight pointing orthogonal to a rail and above the Earth's horizon.

4. The apparatus of claim 1 wherein said apparatus is disposed between and below the top of rails, with said LIDAR pointing toward and above a rail.

5. The apparatus of claim 1 wherein said apparatus is disposed outside a rail and pointing toward said rail.

6. The apparatus of claim 1 wherein said apparatus is disposed outside said rail and pointing toward and above said rail.

7. The apparatus of claim 1 wherein said apparatus comprises a single antenna rather than said array antenna for said transmit path.

8. The apparatus of claim 1 further comprising:
    a track-mounted Frequency Modulated Continuous Wave (FMCW) radar that classifies radar returns from the wheels and side frame of rail cars;
    a radar system comprising an FMCW waveform;
    wide bandwidth to allow for range resolutions of a few centimeters;
    an antenna array to allow for small angular resolutions;
    a single narrow transmit beam;
    digital signal processing (DSP) of returned signals received by said antenna array, providing range and angular estimates of all targets within the field of view; and
    fast system operation to detect the primary targets several times while in the field of view.

9. The antenna boresight of claim 1 wherein the antenna boresight angle is pointed above the Earth's horizon and is located centered between rails and pointed to one side of the rails at 25° to 45° above the Earth's horizon.

10. A method for detection of presence, axle count, direction, and speed of a rail car by a radar comprising:
    installing a chirp radar device disposed between and below the top of the rails wherein wheel detection and axle counting are carried out by radar system-on-chip and the antennas, wherein all systems-on-chip link to a central processing unit that ties to a data extractor by data lines, wherein the radar system-on-chip comprises a high bandwidth radar comprising an advanced signal processing algorithm linked to multiple beams on antenna arrays.

11. The method of claim 10 further comprising detecting presence, axle count, direction, and speed of a rail car by LIDAR.

12. The method of claim 10 wherein presence detection uses vertically-displaced beams pointing toward the rail to detect large returns at adjacent angles versus large and small returns at adjacent angles.

13. The method of claim 10 wherein providing speed and direction are provided by horizontally
    displacing multiple receive beams; and
    detecting the passing of a wheel through the beams.

14. The method of claim 13 further comprising receive beams pointing right and left of boresight in the horizontal direction.

15. The method of claim 10 wherein providing speed and direction as part of the system, are computed utilizing doppler shift and axle counting by discriminating wheels and sideframes.

16. A wheel detection system comprising:
    an antenna boresight pointing toward a rail and slightly above said rail;
    multiple antenna beams that allow discrimination between a rail car wheel and other rail car aspects; and
    a co-located antenna providing rail car speed and direction.

17. The system of claim 16 wherein said multiple antenna beams are formed in vertical, horizontal, or both vertical and horizontal directions.

18. The system of claim 16 further comprising a master processor linking a radar device and providing control, storage, processing, and data transfer functions.

19. The system of claim 16 further comprising:
    a report generator panel;
    a communications hub;
    microwave energy for detection of radar presence, speed, direction, and axle;
    power and data links to a data processor and said report generator panel;
    an antenna;
    coaxial, power and data cables;
    a transponder; and
    a rail car, a rail track, and a rail tie.

\* \* \* \* \*